Patented July 31, 1945

2,380,488

UNITED STATES PATENT OFFICE 2,380,488

DISAZO NAPHTHOPYRIDINE DYES

Christopher Stanley Argyle, Spondon, near Derby, England, assignor to British Celanese Limited, London, England, a company of Great Britain No Drawing. Application November 21, 1942, Serial No. 466,475. In Great Britain January 2, 1942

17 Claims. (Cl. 260—155)

This invention relates to the production of azo dyes and to the colouration therewith of textile and other materials, particularly materials containing organic esters and ethers of cellulose.

According to the invention valuable disazo dyes are obtained by coupling a diazotised aromatic amino-azo compound with a 7-hydroxy-1:2:3:4-tetrahydronaphthopyridine. The invention includes the manufacture of the dyes, the dyes themselves which are disazo dyes having a 7-hydroxy-1:2:3:4 - tetrahydronaphthopyridine as end component, compositions containing the dyes together with other substances, e. g. dispersing agents, processes for the colouration of materials with the dyes and the coloured materials so obtained.

The nomenclature adopted throughout this specification is shown by the following formula for 1:2:3:4-tetrahydronaphthopyridine.

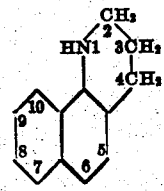

The dyes of the invention produce valuable colourations, particularly blue to bluish-green shades, on cellulose ester or ether textile materials, which are of good dischargeability and good fastness to light. The new azo dyes can be formed on the cellulose ester or ether textile materials, or they can be made in substance and then applied to the textile material. From the point of view of dischargeability it is of advantage to apply the formed dyes to the material.

While the dyestuffs mentioned can be obtained by coupling a diazotised amino-azo compound in acid solution, with any 7-hydroxy-1:2:3:4-tetrahydronaphthopyridine, capable of coupling in the 6 position, e. g. the simple 7-hydroxy-1:2:3:4-tetrahydronaphthopyridine, it has been found that particularly valuable dyes are obtained by using a 3:7-dihydroxy-1:2:3:4-tetrahydronaphthopyridine.

If desired the aminoazo compound and/or the 7 - hydroxy -1:2:3:4 - tetrahydronaphthopyridine may contain other substituents, for example acidylamino, alkyl, alkoxy, hydroxyalkyl, hydroxyethoxy groups or halogen atoms, but when the dyes are to be used on cellulose ester or ether materials, it is preferable that both the diazo component and the coupling component be free from water-solubilising acidic groups, for example sulphonic or carboxylic acid groups.

The amino-azo compounds to be employed in accordance with the invention are preferably those in which the diazotisable amino group is in a para position to the azo group. Thus when 3.7 - dihydroxy-1:2:3:4 - tetrahydronaphthopyridine is coupled with 4-amino-azo benzene, 4-amino - 3.2'- dimethylazobenzene, 4-amino-2:5-dimethoxyazobenzene, benzeneazo-alpha-naphthylamine and 4 - amino -1.1'- azonaphthalene, there is obtained a series of dyes which on cellulose ester or ether materials give particularly valuable shades varying from blue, through bluish-green, to green. Examples of other aminoazo compounds which are suitable for the invention are 2-methoxy-4-amino - 4'- dimethylaminoazobenzene, 2-chlor-4-amino-4'-di-(beta-hydroxy)-ethylaminoazobenzene, 4-amino-2-acetylamino-5-methoxy-1.1'-benzene-azo-naphthalene and 4-amino-2-acetylamino-5-beta-hydroxyethoxy-azobenzene.

The preferred aromatic amino-azo compounds may be prepared by coupling diazotised amines, for example aniline, toluidines, chloranilines and naphthylamines with primary aromatic amines capable of coupling in the para-position to the primary amino group, examples thereof being metatoluidine, para-xylidine, 3-amino-4-methoxy - 1 - methylbenzene, 2:5-dimethoxy-aniline, 2:5 - di(oxyethoxy) - aniline, alpha - naphthylamine and 1-amino-2-naphthol ethyl ether. Primary amines which do not couple readily with diazo compounds in the para-position to the primary amino group, e. g. aniline and ortho-toluidine, can be coupled in the form of their formaldehyde bisulphite compounds, the formaldehyde bisulphite residues being eliminated after coupling.

The azo dyes of the invention can be applied to cellulose ester or ether materials in the form of an aqueous dispersion or solution in organic solvents. Bath methods can be employed, that is to say methods in which the materials are allowed to absorb the dye from a dispersion or solution of the latter in which they are immersed. Again mechanical impregnation methods may be used, the materials being impregnated with a solution or dispersion of the requisite amount of the azo dye. To this end padding or printing methods may be employed. The mechanically impregnated material may then be aged or steamed to cause the azo dye to enter the cellulose ester or ether material.

As regards the procedure to be followed in forming the dyes on cellulose ester or ether materials, it is preferable to incorporate the diazo component in the material and then to effect diazotisation followed by coupling with the coupling component in a separate bath. The diazo compound can be applied to the materials in the form of aqueous dispersions or solutions in organic solvents or by mechanical impregnation followed, if necessary, by ageing or steaming.

Those azo dyes of the present invention which are free from acidic water-solubilizing groups, e. g. sulphonic and carboxy groups, while having substantive affinity for cellulose esters or ethers, have in general substantially no affinity for cellulose or animal fibres. Consequently such azo dyes when applied to mixed materials containing both cellulose, e. g. cotton or regenerated cellulose, and a cellulose ester or ether, will be taken up only by the latter, the cellulose component of the material remaining uncoloured. Thus by suitably colouring the cellulose component of such a mixed material with dyes resisting the cellulose ester or ether component, solid shades or two-colour effects can be readily obtained according to the components and dyes selected. The dye for the cellulose portion can be applied before or after the application of the dye for the cellulose ester or ether portion.

The new dyes are also of value for colouring cellulose ester or ether solutions, especially lacquers and spinning solutions. By shaping and setting such solutions in the form of filaments, straws, films, and the like, valuable coloured products can be produced. For example, coloured cellulose acetate filaments can be produced by dry spinning such coloured solutions.

The invention, so far as it relates to the colouration of materials, is particularly concerned with the production of coloured cellulose acetate products. The new dyes may, however, be used for the production of coloured products of other cellulose esters, for example cellulose propionate, butyrate or acetate-butyrate, or of cellulose ethers, for example methyl, ethyl or benzyl cellulose. Furthermore, the new dyes may be employed for the colouration of materials having a basis of a super-polyamide, e. g., polyhexamethylene adipamide.

The invention is illustrated by the following examples, all parts being by weight:

*Example 1*

19.7 parts of amino-azo benzene are diazotised in the usual manner with hydrochloric acid and sodium nitrite. After removal of the small excess of nitrous acid, the filtered solution is added to 25.2 parts of 3:7-dihydroxy-1:2:3:4-tetrahydronaphthopyridine hydrochloride dissolved in 600 parts of water. Coupling occurs rapidly, and the precipitated dyestuff is filtered, pasted with water and neutralized with sodium carbonate. The dyestuff so obtained gives blue shades on cellulose acetate materials.

Similarly valuable dyes can be obtained by using 4-amino-2:5-dimethoxy azobenzene or benzene-azo-alpha naphthylamine instead of amino-azo benzene, or by using 7 - hydroxy - 1:2:3:4-tetrahydronaphthopyridine instead of the 3:7-dihydroxy compound.

*Example 2*

10 parts of a 10% aqueous paste of benzene-azo-benzene-azo-3:7-dihydroxy - 1:2:3:4 - tetrahydronaphthopyridine prepared as in Example 1 are dispersed in about 3,000 parts of water with the aid of soap and Turkey red oil. 100 parts of a previously scoured cellulose acetate knitted or woven fabric is entered into the bath and the temperature slowly raised to 75–80° C., this temperature being maintained from 1 to 1½ hours, after which the fabric is removed, washed off well and dried. A blue colouration is obtained of good fastness properties. This is readily dischargeable with sodium formaldehyde-sulphoxylate.

*Example 3*

2 parts of 4-amino-2:5-dimethoxy-azo-benzene are dispersed in 4,000 parts of water with the aid of soap and Turkey red oil. 100 parts of cellulose acetate fabric are then dyed in this bath for 1½ hours at 75–80° C., after which the fabric is washed off and diazotised for ½ hour in the cold in a 40:1 bath containing 5% sodium nitrite and 20% concentrated HCl on the weight of the goods. The diazotised material is then washed off, entered into a 40:1 developing bath containing 2% of 3:7-dihydroxy 1:2:3:4-tetrahydronaphthopyridine on the weight of the cellulose acetate, the bath being slowly warmed up to 60° C., and kept at this temperature for ¾ hour. After development the fabric is washed off well and soaped in a ¼ g. p. l. soap solution for 20 minutes at 60° C. The material is thus dyed in a greenish-blue shade of good light fastness.

Having described my invention what I desire to secure by Letters Patent is:

1. Process for the production of a disazo dye which comprises coupling a 7-hydroxy-1:2:3:4-tetrahydronaphthopyridine, capable of coupling in the 6 position, with a diazotized para-amino-mono-azo compound of which the aryl radicles are selected from the group consisting of benzene radicles and naphthalene radicles.

2. Process for the production of a disazo dye which comprises coupling a 3:7-dihydroxy 1:2:3:4-tetrahydronaphthopyridine, capable of coupling in the 6 position, with a diazotized para-amino-mono-azo compound of which the aryl radicles are selected from the group consisting of benzene radicles and naphthalene radicles.

3. Process for the production of a disazo dye which comprises coupling 3:7-dihydroxy 1:2:3:4-tetrahydronaphthopyridine itself with a diazotized aromatic para-amino-mono-azo compound of which the aryl radicles are selected from the group consisting of benzene radicles and naphthalene radicles.

4. Process for the production of a disazo dye which comprises coupling 3:7-dihydroxy 1:2:3:4-tetrahydronaphthopyridine in acid solution with diazotized amino-azo benzene.

5. Process for the production of a disazo dye which comprises coupling 3:7-dihydroxy 1:2:3:4-tetrahydronaphthopyridine in acid solution with diazotized 4-amino-3:2'-di-methyl-azo benzene.

6. Process for the production of a disazo dye which comprises coupling 3:7-dihydroxy 1:2:3:4-tetrahydronaphthopyridine in acid solution with diazotized 4-amino-2:5-di-methoxy-azo-benzene.

7. A 6-(arylazo-arylazo)-7-hydroxy-1:2:3:4-tetrahydronaphthopyridine wherein the azo groups are in para position one to the other and the aryl radicles are selected from the group consisting of benzene radicles and naphthalene radicles.

8. A 6 - (arylazo-arylazo) - 3:7 - dihydroxy - 1:2:3:4-tetrahydronaphthopyridine wherein the azo groups are in para position one to the other and the aryl radicles are selected from the group consisting of benzene radicles and naphthalene radicles.

9. The blue disazo dye obtainable by coupling 3:7 - dihydroxy - 1:2:3:4-tetrahydronaphthopyridine in acid solution with diazotized amino-azo benzene.

10. The blue disazo dye obtainable by coupling 3:7 - dihydroxy 1:2:3:4 - tetrahydronaphthopyridine in acid solution with diazotized 4-amino-3:2'-dimethyl-azo benzene.

11. The blue disazo dye obtainable by coupling 3:7 - dihydroxy 1:2:3:4 - tetrahydronaphthopyridine in acid solution with diazotized 4-amino-2:5-dimethoxy-azo benzene.

12. Textile materials colored with a disazo dye claimed in claim 7.

13. Cellulose acetate textile materials colored with a disazo dye claimed in claim 7.

14. Cellulose acetate textile materials colored with a disazo dye claimed in claim 8.

15. Cellulose acetate textile materials colored with the disazo dye claimed in claim 9.

16. Cellulose acetate textile materials colored with the disazo dye claimed in claim 10.

17. Cellulose acetate textile materials colored with the disazo dye claimed in claim 11.

CHRISTOPHER STANLEY ARGYLE.